United States Patent Office 3,457,202
Patented July 22, 1969

3,457,202
CORK-RUBBER GASKETING AND CUSHIONING COMPOSITION CONTAINING LOW DENSITY CELLULAR RUBBER PARTICLES AND A THERMOSETTING BINDER
Robert H. Hutchinson, Pittsburgh, Pa., assignor to Armstrong Cork Company, Lancaster, Pa., a corporation of Pennsylvania
No Drawing. Filed Mar. 9, 1966, Ser. No. 532,862
Int. Cl. C08g 51/20, 45/04
U.S. Cl. 260—2.5                      5 Claims

ABSTRACT OF THE DISCLOSURE

A molding composition useful in forming gasket and cushioning materials comprised of cork granules, polyhydric alcohol flexibilizer, particles of flexible closed-cell cellular oil-resistant elastomer and a thermosetting flexible epoxy binder.

---

This invention relates general to cork-rubber compositions and more particularly relates to an improved composition for gasketing and cushioning applications containing both cork particles and low density cellular rubber particles together with a relatively flexible thermosetting epoxy-polyamide binder system.

The use of cork-rubber compositions is well known and, although it has been suggested to use small amounts of rubber particles as a filler in conventional cork gasketing and cushioning compositions, gasketing and cushioning compositions possessing a wide variety of enhanced properties, particularly improved conformability and sealability, have heretofore been produced only through rubber compounding techniques. In such processes, the cork particles are basically held together by the rubber which serves as the binder in the finished product. Such compositions may vary considerably in density from relatively rigid materials to low density cork-rubber compositions, for example where the rubber binder contains a blowing agent and is foamed during compounding to form a cellular structure.

In order to overcome the time-consuming production techniques and expensive equipment required in what is basically rubber compounding processes, it is the primary object of this invention to provide a composition which may be fabricated into cork gasketing and cushioning materials having composite properties of materials heretofore achieved by rubber compounding techniques, the compositions resutling in improved conformability and sealability properties in products formed therefrom and being such, moreover, that the expensive time-consuming fabrication techniques associated with conventional rubber-cork gasketing and cushioning compositions is not necessary in fabrication. Thus it is an object of this invention to provide cork-rubber type gasketing and cushioning compositions which may be readily fabricated into gaskets in which only the simplified molding techniques required for conventional cork compositions used for gasketing and cushioning materials is necessary.

These and other objects of this invention will become apparent from the description, taken together with the specific embodiments of this invention, which follows:

In accordance with this invention, a composition consisting essentially of cork granules; a polyhydric alcohol flexibilizer, oil-resistant, flexible, essentially closed-cell cellular elastomeric particles and a heat and/or pressure activatable relatively flexible thermosetting epoxy binder composition lends itself extremely well to conventional cork gasketing manufacturing techniques and cushioning and gasketing materials molded from such compositions have enhanced properties by virtue of the conformability and sealability lent to the composition by the cellular rubber particles. The compositions of this invention are comprised of relative proportions of about 100 parts by weight of cork granules having a particle size in the range of 5 to 60 mesh (all mesh values are U.S. Standard Sieve), 5 to 15 parts by weight of a polyhydric alcohol flexibilizer, 50 to 150 parts by weight of oil-resistant, flexible, substantially closed-cell cellular elastomeric particles having a particle size in the range of 4 to 60 mesh, and about 10 to 30 parts by weight of a flexible thermosetting epoxy binder composition which is the reaction product of (a) about 30% to 70% by weight of an epoxy resin containing terminal epoxy groups, and (b) about 70% to 30% by weight of an epoxy curing agent selected from the group consisting of a polymeric polyamide resin, a polyamine resin, and mixtures thereof.

The thermosetting binder composition preferred for use in the practice of this invention is of the type disclosed in U.S. Patent 2,904,524 and contains an epoxy resin as one of the constituents, preferably a polyglycidyl ether of a polynuclear phenol. The epoxy resins used as the binder constituent in the present invention are complex polymeric reaction products of polyhydric phenols with polyfunctional halohydrins such as epichlorohydrin and glycerol dichlorohydrin. Usually the difunctional chlorohydrin in used in proportions in excess of that equivalent to the polyhydric phenol and less than that which is twice the equivalent amount. The products obtained may contain terminal epoxy groups or terminal epoxy groups and terminal primary hydroxyl groups. In the complex reaction mixture, the terminal epoxy groups are generally in excess of the terminal primary hydroxyl groups. Typical polyhydric phenols include resorcinol and preferably the various bisphenols resulting from the condensation of phenol with aldehydes, the ketones such as formaldehyde, acetaldehyde, acetone, methyl ethyl ketone, and the like, but preferably formaldehyde. Although the molecular weight of the resin is not critical, the resin should be in the form of a liquid initially in order that the binder system may be thoroughly distributed and coated onto the cork and rubber particles.

The polyamide resin, which may be the other constituent of the preferred binder system of the present invention is derived from polymeric fatty acids and aliphatic polyamines. Typical of the polyamides are those made by reacting polymeric fatty acids with ethylenediamine and/or diethylenetriamine. It is possible to produce resins having terminal amine groups or terminal carboxyl groups or in which some of the groups are amine groups while others are carboxyl groups. Since both amine groups and carboxyl groups are useful in curing the epoxy resins, it will be apparent that a wide variety of the polyamides are useful for that purpose. Since the amine groups react more rapidly in curing the epoxy resins, it is preferred to employ polyamides containing excess amine groups. Slower curing may be obtained by use of those polyamides having excess carboxyl groups over the amine groups.

The polymeric fatty acids employed in preparing the polyamide are those resulting from the polymerization of drying or semi-drying oils or the free acids or simple aliphatic alcohol esters of such acids. Suitable drying or semi-drying oils include soya bean, linseed, tung, parilla, oiticica, cotton seed, corn, tall, sunflower, safflower, dehydrated castor oil, and the like. In the polymerization process for the preparation of the polymeric fatty acids, the fatty acids with sufficient double bond functionality combine for the most part, probably by a Diels Alder mechanism, to provide a mixture of dibasic and higher polymeric acids. The most common of these dimerized acids is dilinoleic acid, a 36-carbon unsaturated dibasic acid. The acids resulting from the dimerization process which possess insufficient functionality to react remain as monomers and may be wholly or partially removed, as by distillation. The residue after distillation consists of the desired polymeric acids, and this mixture is used for the preparation of the polyamide resin.

The epoxy and polyamide resins are blended together to form the binder system of the present invention. The relative amounts of the two resins may be varied within certain limits. Generally, the amounts by weight of the epoxy resin and polyamide resin will be in the ratio of epoxy-polyamide from about 30:70 to about 70:30. Mixtures of the two resins wherein the polyamide resin is present in an amount of less than about 30 parts per 100 parts by weight total binder will not cure for the purposes of the present invention. Amounts of the epoxy resin of less than about 30 parts by weight per 100 parts by weight total binder leave too great an amount of uncured polyamide resin. It has been found that unless the weight ratio of the two resins is about 50:50 by weight, there will be an excess of one or the other of the two resins. Where the polyamide resin is in excess, the excess acts as a flexibilizer and, therefore, is often desirable. The precise ratio of the two resins within the two limits given above will be selected in accordance with the degree of flexibility and compressibility of the final cork-rubber composition product. Within the limits given, the higher amounts of polyamide resin yield a more flexible and compressible cork-rubber composition product.

It is also possible to substitute a polyamine resin for all or part of the polyamide resin in the binder system. Preferred are aliphatic polyamines of the formula $H\{HNC_2H_4\}_xNH_2$, where $x$ is a whole number (1, 2, 3, etc.) particularly polyalkylene polyamines such as triethylene tetramine, which combine high reactivity with epoxy resins of low volatility.

The cork granules in the composition of the present invention may be of any convenient size. For most products, it is preferable that a size range of about 5 to 60 mesh be used. Any cork can be used; the particular grade of cork utilized in the present invention is not critical. The cork may be virgin, prime, down through the various grades of refugo and grinding cork. Additionally, waste cork (such as trimmings and the like) of the various grades in regranulated cork composition may be used. Mixtures of the various kinds of cork are often desirable to minimize costs.

As is known in the cork composition art, a flexibilizer for the cork granules is preferably used. These flexibilizers are generally the polyhydric alcohols such as glycerin, ethylene glycol, diethylene glycol, and triethylene glycol. The flexibilizer will generally be added in an amount of about 5–15 parts by weight flexibilizer per 100 parts by weight cork.

The flexible, cellular rubber particles are conveniently formed by comminuting a flexible cellular rubber product of the type disclosed in U.S. Patent 2,849,038. This flexible, substantially closed-cell cellular rubber product is formed by blending a thermoplastic polyvinyl resin having a long melting point range with a rubbery butadiene copolymer selected from the group consisting of butadiene-styrene and butadiene-acrylonitrile copolymers in which the resin is present in an amount in the range of about 25 to 45 parts by weight per 100 parts by weight of the rubber, adding filler and plasticizer to the mix and intimately blending a blowing agent therein in an amount of about 1 to 25 parts by weight blowing agent per 100 parts by weight of said rubber to form a sulphur-free mixture which is extruded and heated at a temperature sufficient to decompose the blowing agent and to isotropically expand and thus form the closed-cell cellular rubber product. Preferably the blowing agent utilized is p,p′-oxybis (benzene sulfonyl hydrazide) and the preferred polyvinyl resin is polystyrene.

The following examples will illustrate specific embodiments of this invention:

EXAMPLE 1

Ingredients: Parts by weight
Granulated cellular rubber [1] having a bulk density of about 6#/cu. ft.—5 to 40 mesh [2] __ 127
Granulated cork having a bulk density of about 6#/cu. ft.—10 to 40 mesh [2] _____ 55
Triethylene glycol _____ 10
Epoxy resin having the general formula:

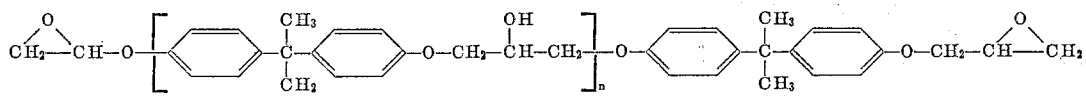

a color [3] at 25° C. of 5 max., a viscosity [4] at 25° C. of 100–160 and an epoxide equivalent [5] of 180–195 _____ 22
Polamide resin—a thremoplastic polymer prepared by condensation of a polymerized unsaturated fatty acid of the nature of dilinoleic acid and an aliphatic amine of the nature of ethylene diamine (Versamid 125 sold by General Mills), amine value [6] of 290–320, viscosity [7] at 75° C. of 7–9 poises, and a color, Gardner, max. of 12 _____ 15

[1] An extruded product subjected to free expansion at 300° F. from a composition containing 100 parts by weight butadiene-styrene copolymer (23% styrene), 35 parts by weight polystyrene, 35 parts by weight carbon black, 25 parts by weight of aliphatic hydrocarbon oil (dipolymer oil) and 14.7 parts by weight p,p′-oxybis (benzene sulfonyl hydrazide).
[2] U.S. Standard Sieve.
[3] Gardner—color of transparent liquids (ASTM D1544-58T).
[4] Kinematic viscosity (ASTM D445–53T).
[5] Grams of resin containing one gram equivalent of epoxide (ASTM D1652–59T).
[6] Equals mg. of KOH equivalent to one gram of polyamide as determined by HCl titration.
[7] Brookfield Viscometer Model RVF, #3 Spindle, 20 r.p.m.

The granulated particles of cork and cellular rubber were added to an impact mixer and a pre-mix containing the resins and the triethylene glycol was added thereto and mixing was carried out for about 10 minutes. The well-mixed composition was then discharged into a mold measuring 36″ x 36″ x 3″ and the mold was held in a convection oven at about 200° F. for about 10 hours. At the end of that time the mat was removed from the mold and sheets for testing were cut from the slab and compared to sheets of a standard cork composition formed in the same manner from a mixture containing 100 parts by weight granulated cork, 7 to 35 mesh; 6 parts by weight of animal glue; and 12 parts by weight of triethylene glycol.

The resultant sheets had the following properties:

| Physical properties | Composition of Example 1 | Standard cork composition |
|---|---|---|
| Density (lbs./cu.ft.) | 35 | 20 |
| Tensile strength | 101 | 106 |
| Elongation, (percent) | 25 | 10 |
| Compressibility (percent) | 43 | 36 |

As shown in the above comparison, cork-rubber sheets prepared from the compositions of this invention have improved elongation and compressibility properties at higher densities than sheets prepared from standard cork compositions, in fact that they are not substantially different from a typical cork-sponge rubber sheet material prepared by rubber compounding techniques. Such a typical cork-sponge rubber sheet material of 32 lbs./cu.ft. density would have a percent compressibility in the range of 35–50. The improved compressibility achieved in gasketing and cushioning materials formed from the compositions of this invention results in products having greatly enhanced conformability and sealability characteristics.

When 7 parts by weight of polyamine was substituted for 7 parts by weight of the polyamide resin in the composition of Example 1, the processing of the mix was benefited due to a lowering of the viscosity of the resin component and essentially identical physical characteristics were achieved in the molded products. At about 35 pounds per cubic foot density the molded product had a percent compressibility of about 43.

EXAMPLE 2

| Ingredient: | Parts by weight |
|---|---|
| Granulated cork, 12–34 mesh (U.S. Std. Sieve) | 50 |
| Granulated cellular rubber [8] (all particles passed ⅛″ screen) | 66 |
| Eureka oil—paraffinic petroleum hydrocarbon | 10 |
| Triethylene glycol | 15 |
| Water | 3 |
| Polyamide resin [8] | 13 |
| Epoxy resin [8] | 7 |

[8] Composition identical to Example 1.

The above composition was used to form mats 12″ x 6″ x 2″ in size by molding at 120° F. for 3 hours and 180° F. for 4 hours to give cushioning and gasketing sheet materials having excellent conformability and sealability properties and respective densities of 12.6 lbs./cu. ft. and 18.4 lbs./cu. ft.

The compositions of this invention may be conveniently molded into a wide variety of sizes of mats and billets of readily varied densities by means of heat and pressure using conventional techniques for molding cork composition materials. Thus the compositions may be readily molded using conventional molds and convection ovens or by using the dielectric techniques of the type shown in Gard U.S. Patent 2,719,329.

I claim:
1. A heat and/or pressure activatable gasket and cushioning molding composition comprising, in relative proportions, a mixture of:
   100 parts by weight of cork granules having a particle size in the range of 5 to 60 mesh;
   about 5 to 15 parts by weight of a polyhydric alcohol flexibilizer;
   about 50 to 150 parts by weight of oil resistant, flexible, substantially closed cell cellular elastomeric particles having a particle size in the range of about 4–60 mesh, said particles having been formed by comminuting a flexible, substantially closed-cell, cellular, cured, sulfur-free, composition comprised of a rubbery butadiene copolymer selected from the group consisting of butadiene-styrene and butadiene-acrylonitrile copolymers, a thermoplastic polyvinyl resin having a long melting point range in the range of 25–45 parts by weight per each 100 parts by weight of said rubber, plasticizer and filler; and about 10 to 30 parts by weight of a thermosetting flexible epoxy binder composition which is the reaction product of (a) about 30% to 70% by weight of an epoxy resin containing terminal epoxy groups and (b) about 70% to 30% by weight of an epoxy curing agent selected from the group consisting of a polymeric polyamide resin, a polyalkylene polyamine, and mixtures thereof.

2. A molding composition in accordance with claim 1 in which the cells of said elastomeric rubber particles are formed by the gaseous decomposition products of p,p′-oxybis (benzene sulfonyl hydrazide).

3. A molding composition in accordance with claim 3 in which said polyvinyl resin comprises polystyrene.

4. A molding composition in accordance with claim 1 in which the thermosetting binder comprises the reaction product of (a) about 30% to about 70% by weight of an epoxy resin which is a polyglycidyl ether of a polynuclear phenol and (b) about 70% to 30% by weight of a polyamide resin which is the reaction product of polymeric fatty acids containing at least two carboxyl groups and an aliphatic polyamine, said polyamide resin containing free groups selected from the groups consisting of amine groups and carboxyl groups.

5. A molding composition in accordance with claim 3 in which the thermosetting binder comprises the reaction product of (a) about 30% to about 70% by weight of an epoxy resin which is a polyglycidyl ether of a polynuclear phenol and (b) about 70% to 30% by weight of a polyamide resin which is the reaction product of polymeric fatty acids containing at least two carboxyl groups and an aliphatic polyamine, said polyamide resin containing free groups selected from the groups containing of amine groups and carboxyl groups.

References Cited
UNITED STATES PATENTS

| 2,849,028 | 8/1958 | Clark et al. | 260—2.5 |
| 2,904,524 | 9/1959 | Baumgartner | 260—18 |
| 3,101,243 | 8/1963 | Hawkes | 264—109 |

MURRAY TILLMAN, Primary Examiner

W. J. BRIGGS, SR., Assistant Examiner

U.S. Cl. X.R.

260—9, 17.4, 37, 837

PO-1050
(5/69)

UNITED STATES PATENT OFFICE
CERTIFICATE OF CORRECTION

Patent No. 3,457,202       Dated July 22, 1969

Inventor(s) Robert H. Hutchinson

It is certified that error appears in the above-identified patent and that said Letters Patent are hereby corrected as shown below:

Page 1, Column 1, Line 22, change "general" to --generally--.

Page 1, Column 1, Line 50, change "resutling" to --resulting--.

Page 2, Column 3, Line 65, change "U. S. Patent 2,849,038" to --U. S. Patent 2,849,028--.

Page 2, Column 4, In Example 1, under ingredients, the formula set forth for the "Epoxy resin having the general formula" should be:

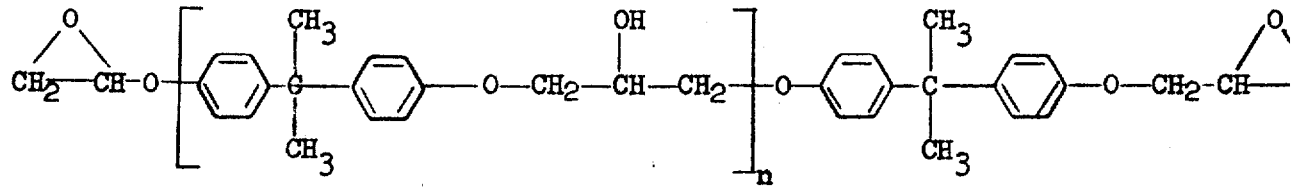

Page 2, Column 4, Line 30, change "thremoplastic" to --thermoplastic--.

Page 3, Column 5, Line 1, change "compositions, in fact that they are not substantially differ-" to --compositions, in fact they are not substantially differ- --.

Page 3, Column 6, Line 21, change "claim 3" to --claim 2--.

Page 3, Column 6, Line 41, change "containing" to --consisting--.

SIGNED AND
SEALED
APR 28 1970

(SEAL)
Attest:

Edward M. Fletcher, Jr.
Attesting Officer

WILLIAM E. SCHUYLER, JR.
Commissioner of Patents